Sept. 20, 1927.　　　A. H. GREBE　　　1,642,676
ILLUMINATING DIAL
Filed May 28, 1925　　　2 Sheets-Sheet 1

Sept. 20, 1927.
A. H. GREBE
1,642,676
ILLUMINATING DIAL
Filed May 28, 1925
2 Sheets-Sheet 2
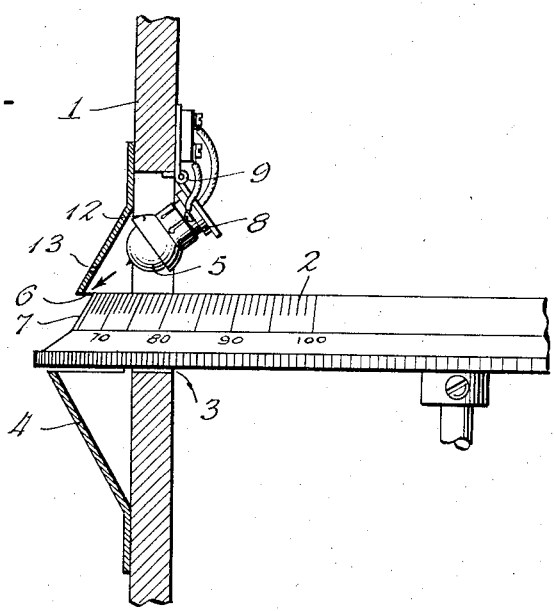
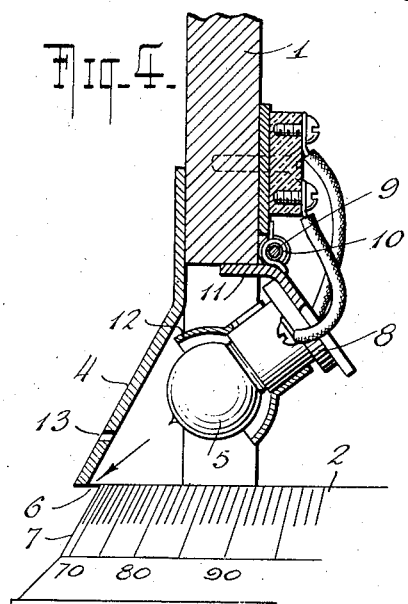
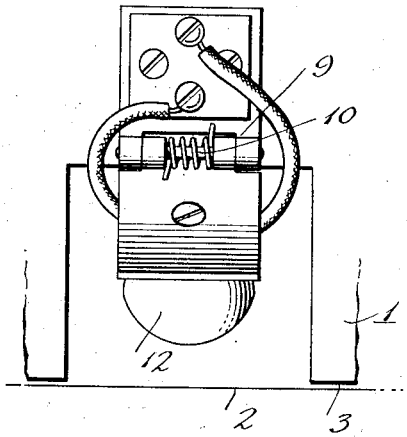
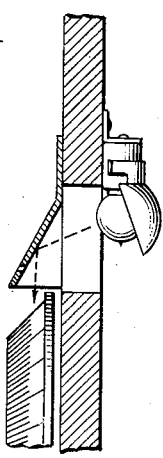

Patented Sept. 20, 1927.

1,642,676

UNITED STATES PATENT OFFICE.

ALFRED HENRY GREBE, OF HOLLIS, NEW YORK.

ILLUMINATING DIAL.

Application filed May 28, 1925. Serial No. 33,424.

My invention, while not limited in its application, is particularly adapted for use in apparatus or instruments in which dial illumination will prove of aid in reading the scales to determine proper or necessary adjustment of the control members.

For convenience of illustration, the present embodiment of the invention is specially designed for application to a radio receiver, the control dials of which, must, ordinarily, be adjusted to a nicety, to tune the set to resonance at various frequencies.

In the average household, the radio receiver is found placed at such distance from either natural or artificial light, that it is impossible to readily and conveniently read the scales of the control dials and, as a result, the average user works in semi-darkness and experiences considerable difficulty in "tuning in".

In order to remedy this trouble, the present invention is designed to illuminate the control dial scales by a glow, reflected from concealed sources of artificial light. Shielding of the sources of light avoids an objectionable glare from the set and permits the light to be directed and concentrated on points of the dial scales where the readings are taken.

Another feature of the invention consists in utilizing the dial scale lamps as tell-tale lights for the vacuum tubes of the receiver. This is accomplished by connecting such lamps in circuit with the tubes, so as to be simultaneously controlled by the filament rheostat.

The accompanying drawings will serve to illustrate a construction and arrangement suitable for carrying my invention into effect.

In the drawings—

Fig. 3 is a cross-sectional view taken on the line 3—3, of Fig. 1;

Fig. 4 is a similar view, on an enlarged scale showing additional details;

Fig. 5 is a view from the rear of Fig. 4;

Fig. 6 illustrates a modification, and

Figure 1:
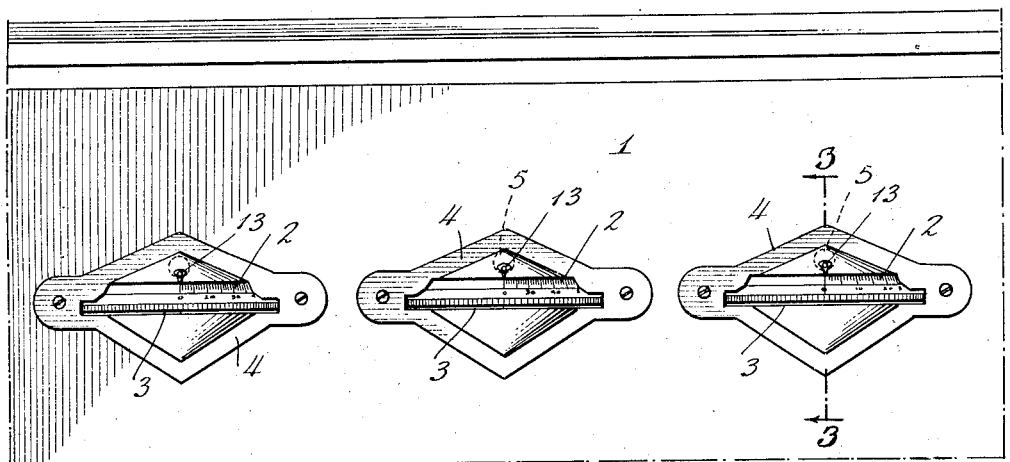
Fig. 1 is a view in elevation, showing a portion of the front of the panel of a radio receiver.
Figure 2:
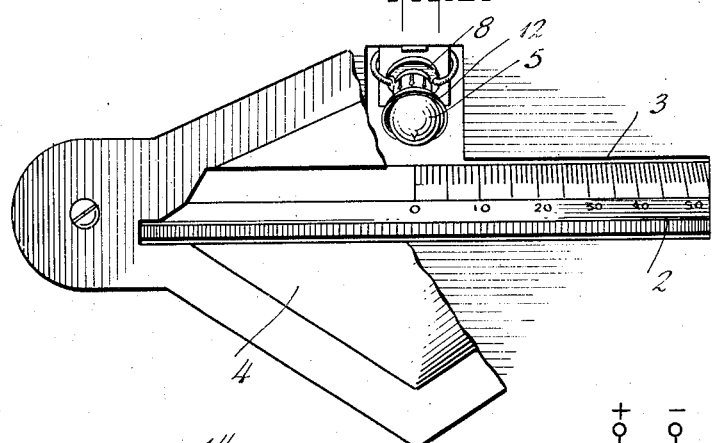
Fig. 2 is a detail view, on an enlarged scale, showing one of the dial lamps.
Figure 7:
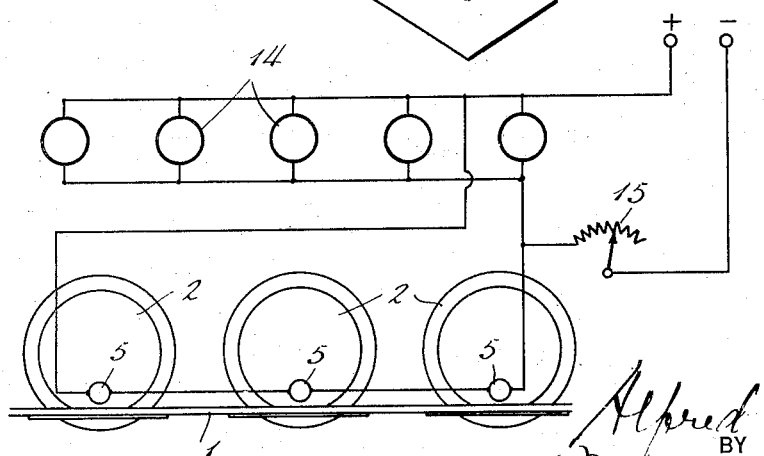
Fig. 7 is a circuit diagram showing the dial scale lamps connected in circuit with the vacuum tubes of the receiver and under the control of the tube filament rheostat.

Referring now to the drawings, 1 indicates the panel of a "Synchrophase" receiver, a type of radio set in which the control dials 2, 2, 2, of the variable tuning elements (not shown) are arranged to present their scaled peripheral faces through slots 3, 3, 3, cut in the panel.

Ornamental sheet metal escutcheons 4, suitably shaped and slotted to encircle and conform to the projecting portions of the control dials, and which, ordinarily, serve only to give a finish to the face of the panel, are here utilized as reflectors for directing light from lamps 5, downward through narrow arc-shaped openings 6, upon the scaled faces 7, of the dials.

The lamps shown are in the form of small electric bulbs, removably mounted, in the usual manner, in sockets 8, hinged at 9, to the panel and yieldingly held in position by springs 10 and stops 11, the arrangement being such as to permit the hinged lamps to be swung around and the bulbs renewed in case of burn-outs. A reflector 12, may be employed, if desired, to concentrate the rays of light at the center of the dial face, where the reading is ordinarily taken and for guidance in adjusting the dials with reference to a fixed point, a small opening 13, is formed at the center of each escutcheon adjacent to the scaled face of the dial.

The dial lamps 5 are shown connected in series multiple relation, in circuit with the vacuum tubes 14 of the receiver and, as arranged, simultaneous control is obtained by means of the usual rheostat 15.

The manner of connecting the tubes and lamps in circuit may be varied, if desired, but I prefer the arrangement shown, as the simultaneous control by the filament rheostat causes the dial lamps to act as tell-tales for the tubes, enabling the operator to judge the brilliance of the tube filaments by the intensity of the glow on the dial scales.

In Fig. 6, a modification is shown of adapting the lighting system above described to radio receivers or other apparatus or instruments in which dials are mounted and arranged in planes parallel with the panel.

The operation and advantages of the invention will be apparent from the foregoing description.

Having thus described my invention, what I claim is:

1. In an apparatus for illuminating the control dials of a radio receiver, a panel apertured for the projection of control dials therethrough, a reflector mounted on the exterior of said panel in positions adjacent the projecting control dials, lamps mounted on the rear of said panel directly opposite said reflectors and spring means for yieldingly securing said lamps in a position adjacent said control dials and behind said reflectors for illuminating said control dials.

2. In an apparatus for illuminating the control dials of a radio receiver a panel structure apertured for the projection of a plurality of control dials therethrough, reflectors secured to the front of said panel structure for substantially closing the apertured portion of said panel structure and around said control dials and lamp devices yieldingly secured to the rear of said panel structure in positions whereby said lamps extend through the apertured portions of said panel structure immediately behind said reflectors and over said control dials for illuminating the peripheral edge of said control dials.

3. In an apparatus for illuminating the control dials of a radio receiver, a panel structure apertured for the projection of a plurality of control dials therethrough, a reflector secured to the front of said panel structure in positions over the apertured portions of said panel structure and serving as a frame for the peripheral edge of said control dials, lamp devices hingedly mounted on the rear of said panel structure and spring pressed to a position within the apertured portions of said panel structure immediately behind said reflectors and over said control dials for illuminating the peripheral edge of said control dials.

4. In an apparatus for illuminating the control dials of radio receiver apparatus, an apertured panel structure, a control dial projecting through apertured portions of said panel structure, a reflector secured to the front of said panel structure and forming a frame around the projecting edge of said control dials, hingedly mounted bracket members secured to the rear of said panel behind said reflectors, a lamp carried by each of said hingedly mounted brackets, spring means for urging said lamps to a position within the apertured portions of said panel structure over said control dials and behind said reflectors and limiting stops on said bracket members arranged to abut against the upper apertured portions of said panel structure for fixing the position of said lamps behind said reflectors.

ALFRED HENRY GREBE.